March 5, 1963

C. SAMUEL 3,080,309

STABILIZING SYSTEM FOR NUCLEAR REACTORS, PARTICULARLY THOSE OPERATING WITH BOILING WATER

Filed Dec. 1, 1959

INVENTOR
CLAUDE SAMUEL
BY Irwin S. Thompson
ATTY.

INVENTOR
CLAUDE SAMUEL
BY Irwin S. Thompson
ATTY.

3,080,309
STABILIZING SYSTEM FOR NUCLEAR REACTORS, PARTICULARLY THOSE OPERATING WITH BOILING WATER
Claude Samuel, Paris, France, assignor to Societe Indatom, Paris, France, a corporation of France
Filed Dec. 1, 1959, Ser. No. 856,532
Claims priority, application France Dec. 3, 1958
2 Claims. (Cl. 204—193.2)

My invention has for its object a stabilizing system for nuclear reactors, particularly those operating with boiling water.

It is a well-known fact that certain nuclear reactors may be subjected to oscillation and even unsteady operation, which limits their field of application, even when their power is adjusted through the usual means. This is the case, in particular, for reactors operating with boiling water which are subject to oscillatory phenomena limiting the power which may be tapped off the reactor to a predetermined threshold.

It is a well-known fact that a boiling reactor includes an enriched uranium core, which is moderated and cooled by a circulation of water, which water is allowed to boil, with a view to using the steam produced in a turbine. Now, the steam bubbles originating in the core reduce the volume of the moderator and produce a corresponding reduction of the reactivity. Such a boiling reactor is controlled to this end by drawing out the absorbing adjusting bars, which has for its result an increase in power. There is formed, consequently, a certain amount of bubbles which stops the increase in power at the moment at which the action of the bubbles opposing the reactivity balances exactly the reactivity released by the drawing out of the bars. The power is thus stabilized at a level which is all the higher when the adjusting bars have been drawn out to a greater extent and the reactor shows apparently an intrinsic reliability by reason of its high bubble-producing coefficient.

Now, whereas experience shows that the procedure is that disclosed hereinabove for small powers, the case is not the same when the adjusting bars are drawn out beyond a point corresponding to a predetermined power level; the power is no longer stabilized, but is subjected, in fact, to large oscillations which prevent continuing operation and limit practically the power to be produced by the reactor.

It is a known fact that it is possible to raise said threshold of instability by reducing the time constant of the heat exchanges through suitable arrangements of the core or by increasing the speed of flow of the water by means of circulating pumps. These contrivances make the execution of the plant very intricate, while they are of a limited interest.

My invention has for its object stabilizing means which allow modifying, through particularly simple means, the intrinsic stability of operation of the reactor, so as to increase thereby to a considerable extent the power which may be tapped off the reactor in a fully reliable manner.

The stabilizing means according to my invention include chiefly a detector of neutron flux adapted to produce an electric signal proportional to the power produced by the reactor, a correcting circuit adapted to produce a lead in phase, a stabilizing member constituted by a neutron-absorbing element of a variable area formed for this purpose inside the reactor core, and, lastly an auxiliary control mechanism adapted to produce, through the agency of said absorbing member, a modification in the reactivity, under the control of the output signal of said correcting circuit.

Such an arrangement stabilizes the reactor through its mere presence and it is not necessary for it to control a large reactivity. The stabilizing adjustment performed by the auxiliary mechanism is independent of the power adjustment or main adjustment which may be, as precedingly, executed by hand or through any other usual means. The action of the stabilizing member may be of a magnitude equal to 1% of that of the main adjustment, so that it may be controlled with exceptionally high results through extremely simple means, the selection and arrangement of which form one of the objects of my invention.

The features and advantages of my invention will appear in the reading of the following description, reference being made to the accompanying drawings, wherein.

Figure 1:
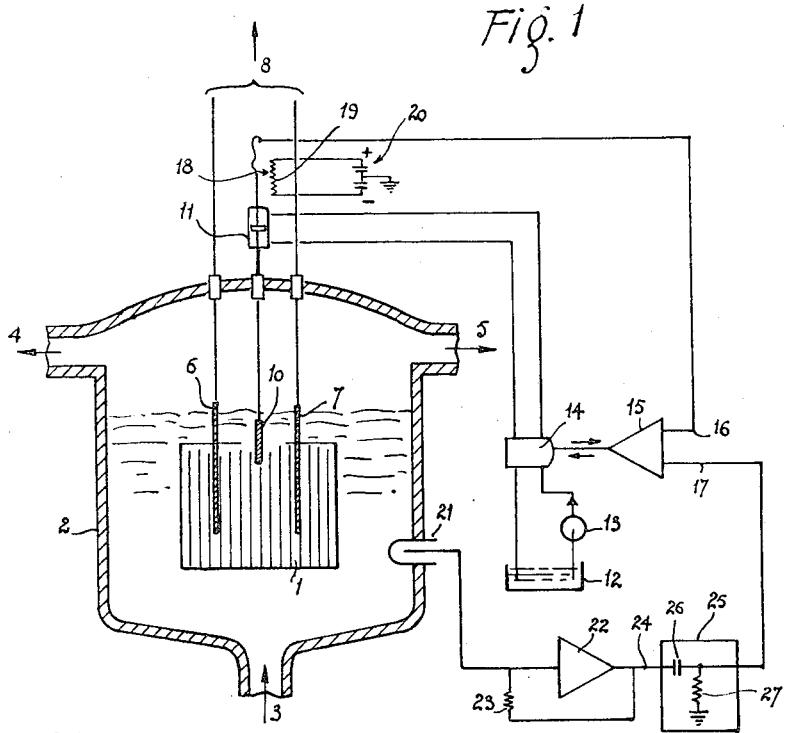
FIG. 1 is a simplified diagram of stabilizing means according to my invention, as applied to a boiling water reactor.

In the embodiment illustrated in FIG. 1, the reference number 1 designates the core of the boiling reactor lying inside a casing 2 provided with a water input 3 at its lower end and two steam outputs 4 and 5 at its upper end. The power of the reactor is controlled by drawing out the absorbent bars 6 and 7 through the usual means, for instance manual means, as illustrated by the arrows 8.

The stabilizing arrangement according to the invention includes, independently of the usual adjusting absorbent bars 6 and 7, a further bar 10, the total surface of which is substantially smaller than that of the bars 6 and 7, say about one hundredth of the latter. The operative section of said bar 10, i.e. the section of said auxiliary bar which is actually introduced into the core 1, is controlled by an auxiliary power unit 11 constituted, in the present case, by a double acting hydraulic jack. The hydraulic fluid sucked out of a vat 12 by a pump 13 is selectively directed towards either side of the jack piston by a distributing valve 14 according to the sign of the electric current fed by a differential amplifier 15 provided with two input terminals 16 and 17. The input terminal 16 is connected with the slider 18 of a potentiometer 19 inserted across the terminals of a D.C. supply 20, the middle point of which is connected to ground. The slider 18 is mechanically connected with the rod common to the piston of the jack 11 and to the auxiliary bar 10, whereby the voltage tapped by the slider 18 off the potentiometer 19 and applied to the terminal 16 corresponds in magnitude and in sign to the location of the stabilizing bar 10 with reference to a so-called inoperative position for which about one half of said bar dips inside the reactor core.

The stabilizing system includes furthermore a detector of neutron flux constituted, as well known per se, by an ionizing chamber 21 followed by the amplifier 22, the operation of which is rendered linear by the incorporation of a negative-reaction loop 23. Said arrangement feeds, through its output 24, a D.C. voltage forming a signal defining the neutronic power of the reactor. For the normal operative range, said signal follows the variations of the power generated by the nuclear reactor, with a negligible time constant. The arrangement is associated with a correcting circuit 25 adapted to transform this power-detecting signal into a signal by serving as the auxiliary mechanism controlling the second input 17 of the amplifier 15.

The chief feature of the correcting circuit 25 consists in that it forms a transfer function, the gain of which increases with the frequency. By way of an indication, it may be mentioned that it is constituted in the present case by a mere derivation circuit formed by a series condenser 26 and a resistance 27 in parallel. The derivative obtained thereby has a gain increasing uniformly with the frequency. The correcting circuit 25 may, of course, be given a more intricate structure, taking into account the actual cause of the oscillations to be eliminated and in accordance with the well-known technique of auxiliary control mechanisms.

The arrangement thus constituted transforms the stabilizing signal produced by the power detector 21—22 and the correcting circuit 25, and applied to the amplifier input 17, into modifications of reactivity, through the agency of the auxiliary control mechanism 11—12—13—14, the stabilizing bar 10 being controlled, as to position, by such a stabilizing signal. Said modifications should be performed in the direction providing for negative reaction and with time constants low as possible. This latter condition consists, in other words, in executing an auxiliary control mechanism with a high performance and adapted to produce an increasing gain up to frequencies which are comparatively high. Now, in accordance with a chief feature of my invention, said performance or frequency limit may be raised up to values, the magnitude of which is quite outside the possibilities of operation of the usual auxiliary adjusting mechanisms which are to control the total reactivity of the reactor and to show a corresponding efficiency. The efficiency of stabilization may be limited, in contradistinction, and as already mentioned, to values of the magnitude corresponding to 1% of the adjusting efficiency and, consequently, the weights and the movements to be controlled are reduced to a still greater extent, which leads to the possibility of a corresponding reduction of the various time constants with a corresponding increases in the possible range of useful operative frequencies, i.e. of the frequencies for which the stabilizing member such as the bar 10 of FIG. 1 is capable of responding to the modifications in the stabilizing signal produced by the correcting circuit 25.

Instead of being constituted in a manner similar to the actual adjusting bar by an absorbent bar such as 10 which enters to a varying extent inside the reactor core, the stabilizing member according to my invention may be constituted, according to a modification, by an absorbent system of a varying area, for instance by two cadmium sheets or two groups of cadmium sheets moving with reference to each other, after the manner of an adjustable condenser, by executing a rotary or a translational movement. The rotary movement being limited to 90° or the translation movement being limited to a few millimeters, the driving motor may be of a particular type, which allows obtaining very high performances.

Figure 2:
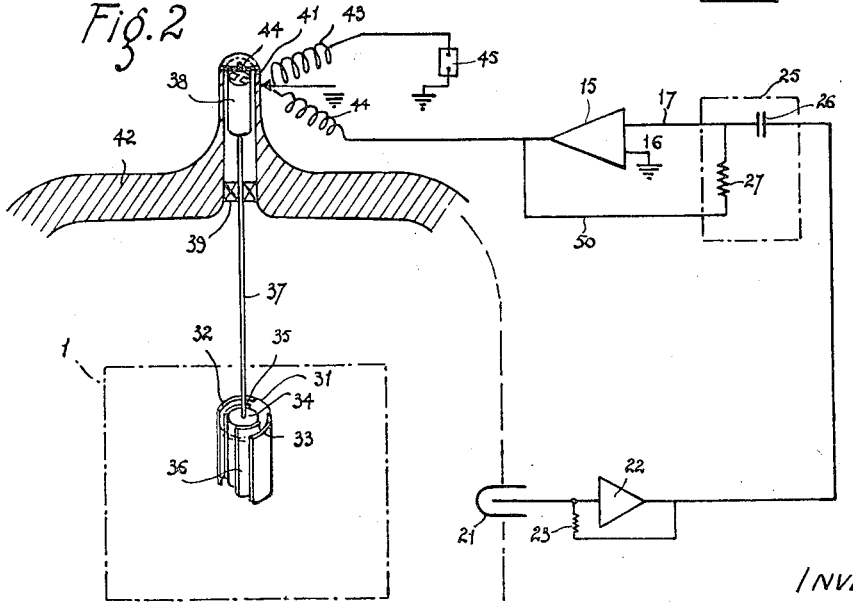
FIG. 2 is a similar diagram illustrating a modification.

I have illustrated, for instance, in FIG. 2, a stabilizing member constituted by a stationary cylindrical plate 31 provided with cadmium sheets 32 and 33 arranged in diametrical quadrants of its side wall, while an inner coaxial rotary plate of an also cylindrical shape carries two diametrically opposed cadmium sheets 35 and 36. Said rotary plate is connected with the shaft 37 of a rotor 38 revolvably carried in roller bearings 39 and in thrust bearings 40 provided inside an extension 41 of the cover 42 of the reactor casing. The rotor 38 is constituted preferably by a permanent magnet cooperating with two windings 43 and 44 arranged at 90° from each other outside the extension chamber 41.

The winding 43 is fed by the D.C. supply 45, so as to urge the rotor into an angular position for which the sheets 35 and 36 on the rotary plate are located in an intermediate position between their position of minimum efficiency registering with the corresponding sheets 32 and 33 of the stationary plate and a position perpendicular to last-mentioned position for which their efficiency is maximum and the total area exposed to the flow of neutrons is a maximum.

The winding 44 is fed by the output current fed by the amplifier 15, the input 16 of which is connected to ground together with the middle point of the winding system 43—44.

A reaction loop 50 forms, on the other hand, grounding means through the winding 44 for the resistance 27 inserted in parallel and forming part of the correcting circuit 25.

The current flowing under such conditions through the winding 44 corresponds thus, as to magnitude and sign, to the stabilizing signal formed by the circuit 25 and amplified by the amplifier 15 and produces corresponding angular deflections of the rotor 38 and, consequently, of the rotary plate 31 to either side of its medial position of equilibrium. This ensures thus the desired control of the position of the stabilizing member in accordance with the desired modifications of the absorbent surface.

The rotary absorbent element is thus driven directly, in the present case, without any speed reduction or auxiliary mechanical members, through the electromagnetic action exerted on the permanent magnet forming the rotor, which shows the advantage of cutting out the use of brushes and providing a perfect fluid tightness between the rotor located inside the casing and the stator located outside said casing.

Figure 3:
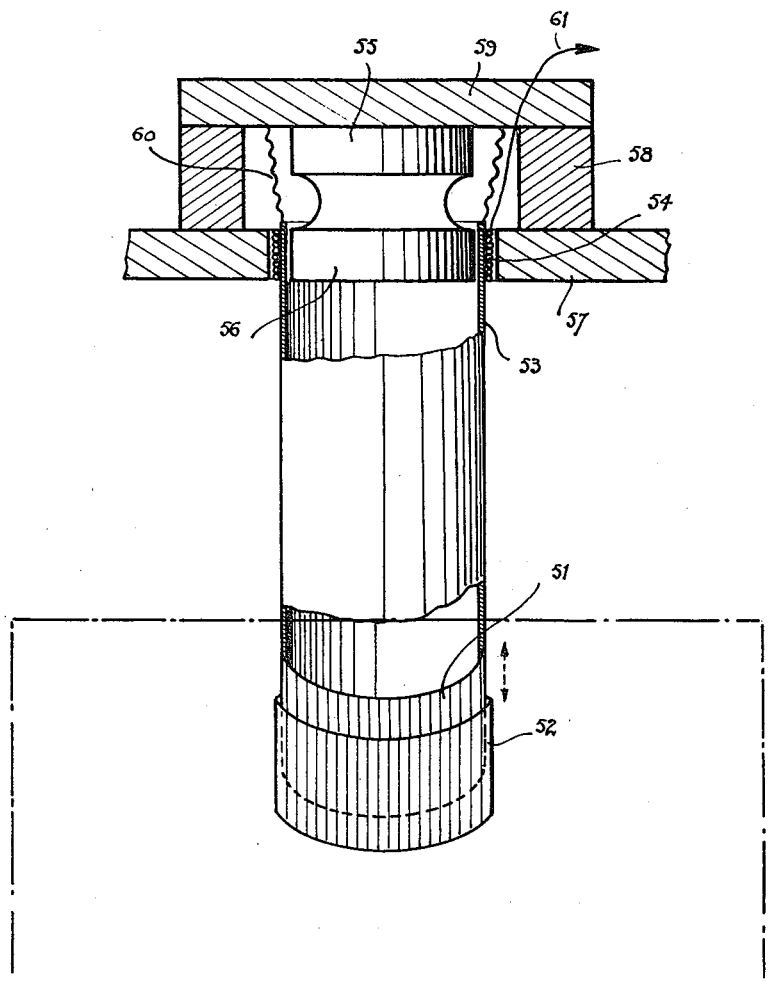
FIG. 3 illustrates partly and diagrammatically a further modification.

According to a further modification illustrated diagrammatically in FIG. 3, I may use a stabilizing member provided with a variable absorbent surface constituted by an absorbent sheet 51 of a cylindrical shape formed on the surface of the thin tubular light metal skeleton 53 adapted to move axially inside a cooperating absorbent surface 52 formed on the surface of a stationary cylinder coaxial with the skeleton 53. Said skeleton carries at its upper end a winding 54 adapted to be electrically energized and to be inserted after the manner of the movable winding of an electrodynamic loudspeaker inside the gap of a magnetic circuit constituted by a core 55 with its pole piece 56, an annular field plate 57, a permanent annular magnet 58 and a main casing covering and closing plate 59. The field plate 57 may form part of the reactor casing or be associated with the latter in any suitable manner. The movable skeleton 53 is suspended elastically to any stationary member constituted, for instance, by the covering and closing plate 59, such a suspension being illustrated diagrammatically at 60. The movable winding 54 is connected by a yielding cable shown diagrammatically at 61 with the output of the amplifier similar to the amplifier 15 already described, the connections being identical with those provided for the winding 44 in the arrangement of FIG. 2. The returning action provided for the winding 43 in FIG. 2 is replaced in the present case by the elastic suspension such as 60 for the skeleton 53. It should be remarked that in the embodiment illustrated in FIG. 2, it is possible also to substitute for the returning action provided by the winding 43 the returning action of a torsion or the like spring.

As in the precedingly described phase, the movable section 51 of the stabilizing member is driven directly by a motor which is, in the present case, of the electrodynamic type, adapted to provide particularly high performances. The design of such a motor associated with the stabilizing member is capable of various embodiments which are particularly suitable for the special requirements of nuclear reactors. It will be remarked that, for instance, a system such as that illustrated diagrammatically in FIG. 3 and which includes the components 55—59—58 of the magnetic circuit, on the one hand, and the skeleton 53 associated with the suspension 60, on the other hand, may form a readily dismountable plug closing an opening of a limited size provided in the reactor casing and bounded by the field plate 57.

With a view to explaining briefly the theory of operation of the stabilizing means provided by my invention, the reactor should be considered as a control mechanism in which the drawing out of the adjusting bars acts after the manner of an output signal, the gain of said control mechanism being proportional to the power developed.

In the case of a boiling reactor, the counter-reactivity of the bubbles may be considered as a phantom reaction loop extending between the output and the input. The transfer operation of said loop, which is obviously subjected to various time constants ascribable, in particular, to various heat exchanges, has a decreasing gain with a phase lag, depending on the frequency, having a tendency to produce a positive reaction: when the gain of the actual control mechanism rises beyond a predetermined value, as occurs of necessity when the power of the reactor increases, the phase lag reaches 180° and even more, which leads to instability in operation.

The stabilizing method according to my invention may be considered as an insertion in parallel with the above-mentioned phantom reaction loop corresponding to the counter-reactivity of the bubbles, of a real negative reaction loop, the characteristic properties of which oppose those of said phantom loop, to wit: it shows an increasing gain with a phase lead.

It is also important to remark that the reactivity controlled by the arrangement according to my invention remains always of a magnitude which is much lower than the reactivity controlled by the power-adjusting means, so that the stabilizing means cannot lead to any increased danger and, in the most unfavorable case of a failure, the maximum risk consists in returning to the operative conditions of a reactor devoid of my improved stabilizing arrangement.

What I claim is:

1. A stabilizing system for a nuclear reactor comprising neutron flux detector means for producing an electrical signal proportional to the change in the power level of the nuclear reactor, correcting circuit means responsive to said electrical signal and having an increasing gain versus frequency characteristic for producing an electrical control signal, a neutron absorbing member having an absorbing efficiency which varies with its position within said recator, means for generating an electrical signal measuring the position of said absorbing member with respect to a predetermined reference position, amplifier means responsive to said control signal and to said measuring signal, and auxiliary control means responsive to the output signal of said amplifier means for controlling the position of said absorbing member by making the displacement of its position from said reference position proportional to said output signal.

2. A stabilizing system for a nuclear reactor, comprising in combination: neutron flux detector means for producing an electrical signal proportional to variations of the power level of the nuclear reactor, a correcting circuit including a series capacitor and a shunt resistor for producing an electrical control signal, said control signal being the rate of change of the reactor power, a neutron absorbing member having an absorbing efficiency which depends directly upon its position within said reactor, means including at least a potentiometer and a constant voltage source for providing a measuring signal which measures the position of said absorbing member with respect to a predetermined reference position, differential amplifier means responsive to said control signal and to said measuring signal, and auxiliary control means responsive to the output signal of said differential amplifier means for controlling the position of said absorbing member by making the displacement of its position from said reference position proportional to said output signal.

References Cited in the file of this patent

Nuclear Power, vol. 1 (August 1956), pages 161–164. Article by Cox.

Nuclear Power, vol. 3 (April 1958), folded pages between pages 146 and 147 and between pages 170–171.